United States Patent

[11] 3,564,164

[72] Inventor Robert E. Prescott
Rumson, N.J.

[21] Appl. No. 700,521
[22] Filed Jan. 25, 1968
[45] Patented Feb. 16, 1971
[73] Assignee Bell Telephone Laboratories, Incorporated
Murray Hill, N.J.

[54] METHOD FOR CONSTRUCTING TELEPHONE STATIONS USING FLOWABLE, ADHESIVE HARDENING MATERIAL; AND INSTRUMENTS SO BUILT

3 Claims, 4 Drawing Figs.

[52] U.S. Cl. ........................................................ 179/178, 179/103
[51] Int. Cl. ........................................................ H04m 1/02
[50] Field of Search ........................................ 179/107, 179, 178, 184, 101, 100 (D), 107, 107 (E), 103; 264/45, 47 (Cursory), 41

[56] References Cited

UNITED STATES PATENTS

| | | | |
|---|---|---|---|
| 3,187,069 | 6/1965 | Pincus et al. | 254/45 |
| 3,073,911 | 1/1963 | Mattke et al. | 179/179 |
| 2,944,170 | 7/1960 | Knapp et al. | 264/45 |
| 2,718,563 | 9/1955 | Nicholides | 179/107 |
| 3,153,694 | 10/1964 | Tomlinson | 264/45X |

*Primary Examiner*—Kathleen H. Claffy
*Assistant Examiner*—Thomas W. Brown
*Attorneys*—R. J. Guenther, Edwin B. Cave

ABSTRACT: The packaging of a telephone handset or base is simplified and assembly costs reduced by using a flowable adhesive hardening substance as an interior fill. The substance, such as polyurethane foam, retains all components in desired position, firmly bonds the mating shells together so that no other fastening is needed, and with the plastic shells forms a composite structure providing the required strength, rigidity, and protection against tampering and mechanical shock.

INVENTOR
R. E. PRESCOTT
BY Charles E. Graves
ATTORNEY

METHOD FOR CONSTRUCTING TELEPHONE STATIONS USING FLOWABLE, ADHESIVE HARDENING MATERIAL; AND INSTRUMENTS SO BUILT

FIELD OF THE INVENTION

This invention relates to the assembly of telephone station apparatus, and more especially to a simplified method for constructing a telephone handset or a telephone base which has wide ramifications in terms of assembly cost and maintenance practice.

BACKGROUND OF THE INVENTION

It has long been routine in the telephone industry to manually secure the components within a telephone handset or base by means of mechanical fasteners, such as screws, from a component to a prescribed interior mounting surface. After the components are so mounted, the handset or base is completed with suitable caps or plates which usually also involve threaded fastenings. Or, as in the disclosure of L. N. Wilder, Ser. No. 364,974, filed May 5, 1964, and assigned to applicant's assignee, now U.S. Pat. No. 3,384,718, a second shell is matably disposed onto a first shell which contains the components, and the two are secured with metallic fasteners.

Behind this classic approach to handset and base assembly is the traditional reliance on the strength and reliability of mechanical fastenings, as well as the self-imposed requirement that the components be accessible for repair and maintenance.

Although the manufacturing skills of the industry enable highly reliable telephone sets of the type described to be produced at an exceedingly modest cost, it is apparent that in years to come labor costs will exert an upward pressure on telephone set prices. Accordingly, a clear need exists to further reduce the number of manual assembly steps; and, more broadly, to design a telephone handset and base which are producible in a highly automated assembly operation.

A second source of concern over cost prospects, however, involves the annual charges attributable to each telephone through the factors of maintenance, installation and repair. This annual charge in total is comparable to the initial manufacturing cost for the set. One contributing factor is that telephone installers usually must install individually each telephone in a household and, when the phone needs repair, make special trips to the phone location to replace the faulty set.

Moreover, the industry's policy of repairing old telephone stations and returning them to service has the effect of keeping the old apparatus in service longer and thereby somewhat damping demand for more up-to-date stations. In the same vein, it seems probable that customer reaction to repaired telephone apparatus being installed in their homes is not as favorable as if the equipment were new with each installation.

One object of the invention, accordingly, is to reduce the cost of manufacturing telephone station apparatus.

Another object of the invention is to reduce the overall cost (manufacture plus maintenance) of the telephone by improving its reliability. A specific objective is to decrease the incidence of failure resulting from impact and vibration.

A further object of the invention is to devise a telephone station assembly scheme which, in concept and cost terms, would render attractive the outright junking of telephone handsets or bases which failed in service, rather than their repair.

An added object of the invention is to realize a greater flexibility of the choice of telephone station apparatus, thus permitting more frequent updating.

In achieving these and other objects, the invention, broadly speaking, contemplates the modularization and encapsulation of the various components to be incorporated into the handset and the base, respectively, and their securing with a suitable adhesive hardening substance which is injected into the remaining unfilled volume. One suitable fill which has proven entirely workable in practice is polyurethane foam.

Pursuant to one facet of the invention, no metal fastenings are needed and hence no provision need be made to receive these fastenings in the handset shell or to keep them tight.

Advantageously, the handset or base shell itself can be thin-walled and unribbed since in the present invention the shell, while contributing to the strength and rigidity of the item, is dependent upon its interaction with the hardening substance to achieve the required strength. Besides backing up the shell, the encapsulating material also retains all component modules in their desired position. If mating shells are used, such as taught in the disclosure of Wilder, supra, the bonding material firmly joins the shells together.

A primary feature of the invention, therefore resides in the method of assembling a telephone handset, which involves bonding the components and the handset shells alike together in a unitary structure by injecting a flowable adhesive hardening plastic into the entire interior cavity so that it surrounds the components.

An added feature of the invention, not found in present-day telephone assemblies, concerns the energy absorbing properties of a foam-filled telephone handset or base, which substantially adds to the set's ability to protect delicate components and their connecting leads.

A further feature of the invention lies in the use of relatively thin-walled handset or base shells, with reliance on a plastic setting material to provide strength and rigidity.

A full understanding of the invention, its further objects, features, and advantages will be gained from a reading of the description to follow of an illustrative embodiment thereof.

DETAILED DESCRIPTION OF THE DRAWING

DETAILED DESCRIPTION OF AN ILLUSTRATIVE EMBODIMENT

The invention is illustrated below by way of an embodiment in the handset and base of a "dial-in-handset" telephone station. The teaching is, however, obviously equally applicable to any telephone station.

Figure 1:
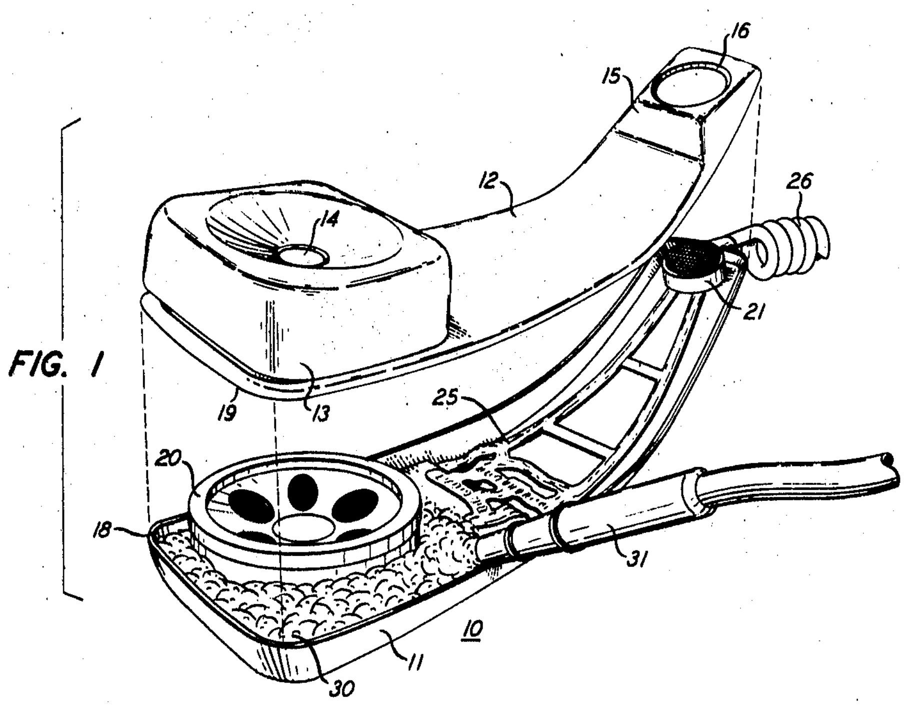
FIG. 1 is a schematic perspective view of a telephone handset constructed and assembled in accordance with the invention.

FIG. 1 illustrates a telephone handset of this sort, which comprises a back shell 11 and a front shell 12. A receiver cap 13 is located at one end of front shell 12 and includes a cuplike ear cavity 14. At the other end of front shell 12 is a transmitter shelf 15 with orifice 16 for a transmitter element. A shown in FIG. 2, a dial opening 17 is provided in back shell 11 at a location, for example, opposite the receiver cap 13.

Shells 11, 12 are quite thin-walled, in contrast to the usual telephone handset shell. The shells do not contain the usual ribs, bosses, and variations in thickness normally encountered in telephone apparatus. These simpler shells hence allow a wide range of choice for fabrication processes, which might include injection molding, blow molding, thermal forming, vacuum forming, and particularly the process of cold forming from extruded sheet. CYCOLAC, the material heretofore used in fabricating telephone handsets, has been found suitable for the present shell structures.

Figure 2:
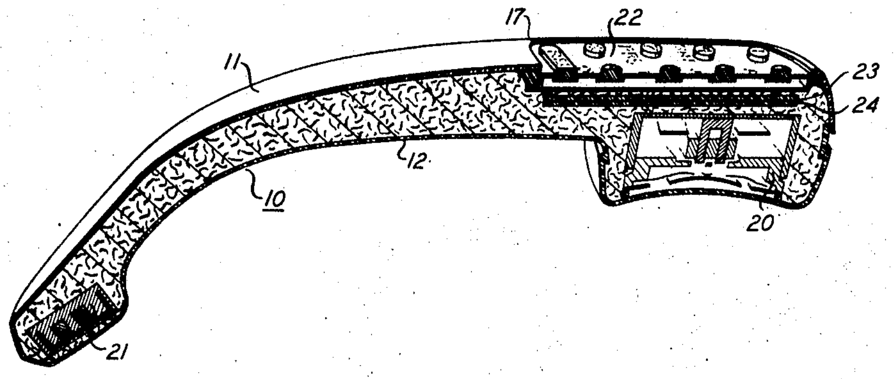
FIG. 2 is a sectional side view of an assembled telephone handset.

The components typically associated with a telephone handset will now be described in their relation to the present invention; but it should be understood that their character, number and function form no part of the present invention. As seen in FIG. 2, a receiver 20 is located at the near end of back shell 11 and a transmitter 21 is at the far end. A dial 22 which may be of the pushbutton type is disposed in dial opening 17. Beneath dial 22 is disposed the microcircuitry containing the usual elements of the speech circuit, the dial circuit and the voltage regulator, including all active components, on two glass substrates 23, 24 cemented back-to-back. This circuitry is of the thin film integrated circuit type now commonly in use. Advantageously, dial 22 and substrates 23, 24 are preconstructed as a single module. Circuits between receiver 20, transmitter 21, dial 22 and any other components to be incorporated in handset 10 are effected, for example, through a flexible printed circuit 25, as shown in FIG. 1, which is connected by routine methods such as thermal impulse welding.

ASSEMBLY PROCESS

The various handset components, including receiver 20, transmitter 21, dial 22, and glass substrates 23, 24 with flexible circuit 25 in place are temporarily secured in back shell 11, as with suitable adhesives. Then, back shell 11 and front shell 12 are placed in matching cavities in a conventional alignment fixture (not shown). In accordance with a prime feature of the invention, a metered quantity of flowable adhesive hardening substance, such as two-part liquid polyurethane is introduced into back shell 11, as shown in FIG. 1, through a suitable injector such as 31. Shells 11 and 12 are then closed along their respective mating edges 18, 19. The foam 30 as it is generated flows around the components as illustrated in FIG. 1, and fills the entire remaining open space within the cavity now defined by the conjunction of shells 11, 12. Advantageously, the foam forms chemical bonds with most of the materials with which it comes in contact. Of great importance, foam 30 forms an excellent bond with the plastic shells, thus locking them together without the need for other fastening means.

When fully cured the foam 30 is rigid, has a low density, exhibits good strength and is virtually chemically inert. The composite structure thus formed has an excellent ratio of stiffness and strength to weight. A suitable plastic foam is polyurethane, but other reasonably suitable flowable adhesive hardening substances include epoxy and phenolic foaming materials.

An important feature of the invention should be noted at this point. Glass-based microcircuitry is inherently fragile and, of course, telephone handsets are subject to considerable abuse in practice. The plastic foam used in the present inventive embodiment to support all of the interior components also provides excellent isolation from mechanical shock and vibration for the glass substrates 23, 24. Additionally, the foam 30 reduces the possiblity of broken leads in the flexible circuit 25. Further, as the hardened foam provides substantially all of the required structural rigidity, the shells 11, 12 can be reduced in thickness, weight and cost. As noted above, all mounting brackets, screws, clamps and other fasteners normally needed to maintain the components in place and the shells in conjunction are completely eliminated in the final assembly.

An example of the invention as applied to a telephone base is described below.

Figure 3:
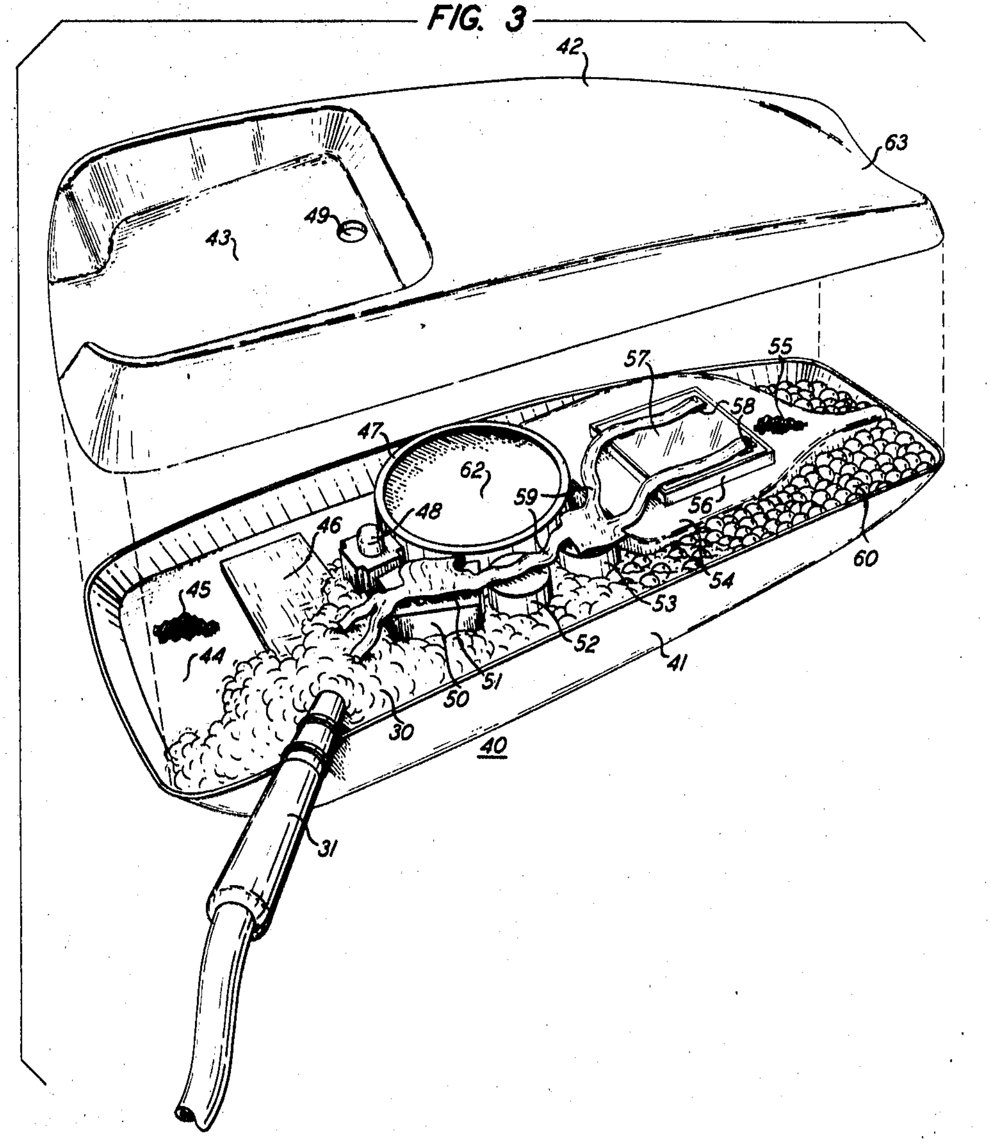
FIG. 3 is a schematic diagram showing a telephone base constructed and assembled in accordance with the invention.

FIG. 3 illustrates a telephone base 40 suitable for use with a dial-in-handset type telephone. Base 40 comprises lower shell 41 and upper shell 42 fabricated by any of the processes noted above with respect to shells 11, 12. Upper shell 42 includes indentations 43 and 63 to accommodate the receiver cap 13 and transmitter shelf 15 of handset 10.

Figure 4:
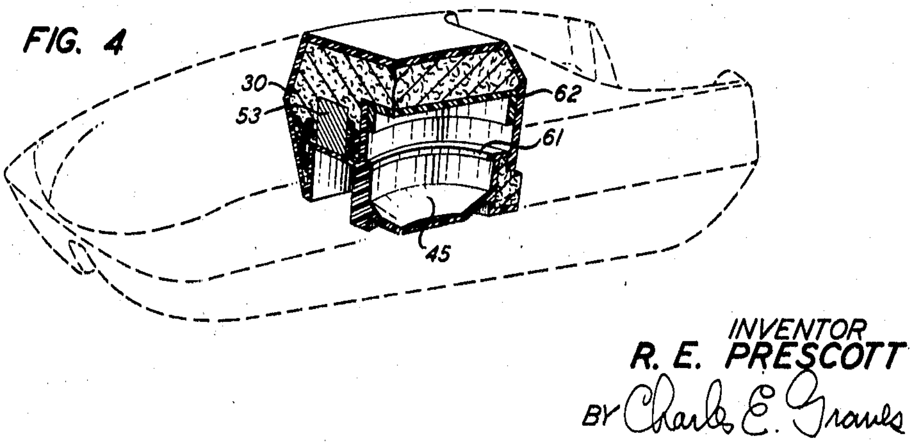
FIG. 4 is a partial sectional view in perspective of an assembled base.

The construction and content of the interior of the lower shell 41 will be described now although the invention obviously is not limited to or contingent upon the specific components noted. A raised platform 44 at a first end of lower shell 41 serves to divide the end volume of that shell. Below platform 44 there may be provided a resonating cavity for the ringer which may be a tone ringer; and upon platform 44 there is supported a microcircuit 46. The latter advantageously is a thin film integrated circuit and contains substantially all of the active and passive circuit components typically associated with the base structure in a dial-in-handset type telephone. Rising from one end of platform 44 is a circular rib 47. As seen in FIG. 4, the interior volume 45 defined by rib 47 comprises a chamber which serves as a housing for the ringer (showing omitted for clarity). A cap 62 covers the entrance to cavity 45. A switch hook and plunger assembly, designated 48, is mounted forward of cavity 45 so that the plunger will protrude through orifice 49 in upper shell 42 when the two shells are joined.

The interior side of a connector housing 50 is shown in FIG. 3, along with several contacts 51 associated with the usual telephone line cord (not shown). Mechanical switches such as 52, 53 are also mounted in the interior of lower shell 41 if it is desired to effect a mechanical control of the volume of the telephone ringer or other control, such as changing the beat rate of the tone ringer to produce distinctive signals.

Rearwardly of cavity 45, as seen in FIG. 3, is located an interior wall 54 which forms a space 55 in the under side of lower shell 41. Space 55 may advantageously be used for housing a retractable handset cord mechanism, for example, and its associated contacts. These contacts make appearances as contacts 58 in the interior of shell 41 through a shelf 56, mounted on a contact board 57. Circuit connections, as needed, are effected between contacts 58 and switches 52, 53, contacts 51, switch hook 48, etc. by conventional means such as flexible circuit.

The mentioned components associated with base 40 are now secured and mechanically isolated by introduction of foam 30 through injector 31 in the manner described above in connection with handset 10. Again, in accordance with the invention foam 30 helps support the interior components, isolates them from mechanical shocks and vibration, and prevents broken leads in the flexible circuit. Most importantly, foam 30 when hardened reinforces and fully rigidifies the shells and provides excellent bonding of the shells 41, 42 so that no fasteners whatsoever are used.

Although a very light weight is desirable in handset 10, base 40 poses a somewhat different problem. Base 40 requires a certain amount of weight combined with high-friction feet in order to prevent its twisting or sliding with light or unintended pulls of the handset cord. With the presence of thin shells and lightweight foam in its structure and the absence of metallic fastenings, the base 40 is undesirably light. However, in accordance with a further feature of the present invention, any amount of weight to stabilize base 40 may be incorporated automatically when constructed pursuant to the invention. This weight may be in the form of lead shot such as 60 illustrated in FIG. 3; or perhaps even more advantageously, gravel which can be purchased graded at approximately 3.00 per ton. The lead shot or gravel 60 thus is disposed within the remaining unfilled volume in shell 41 as illustrated in FIG. 3, for example, at the far end of shell 41. The lead shot or gravel 60 is firmly held in place as a mass by the foam, in a manner not remotely possible with other fastening media. An additional advantage of the foam is that if the set were dropped the foam would absorb the kinetic energy of the added mass distributed in particular manner, thus avoiding damage to the components or shells as might happen if the added mass were in some concentrated form.

It is to be understood that the embodiments described herein are merely illustrative of the principles of the invention. Various modifications may be made thereto by persons skilled in the art without departing from the spirit and scope of the invention.

I claim:

1. A method for assembling a telephone base in which a plurality of components are contained within an interior volume defined by a pair of thin-walled mating shells, said method comprising the steps of fixing temporarily the components in their desired locations within said volume; placing a measured quantity of weighty particulate matter into said volume to lend substantial added mass to said base; applying a metered quantity of flowable, adhesive, hardening substance to the remaining unoccupied space in said volume; and bringing said shells together in bonded relation along their mating edges.

2. A telephone base assembly comprising a shell pair matably disposed to each other forming an interior volume; components disposed in said volume comprising a switch hook, a ringer, and a glass substrate for mounting thin film integrated circuitry; means electrically connecting the named components; a measured quantity of weighty particulate matter disposed within said volume to add mass to said base; and a flowable, adhesive, hardening substance filling the remainder of said volume; said substance rigidly bonding said shells together and rigidly encasing said particulate material.

3. A telephone base assembly pursuant to claim 2, wherein said particulate material is graded gravel.